3,044,982
ORGANOPOLYSILOXANES AND PROCESS FOR PRODUCING SAME

Victor B. Jex, Kenmore, and Donald L. Bailey, Snyder, N.Y., assignors to Union Carbide Corporation, a corporation of New York
No Drawing. Filed Nov. 12, 1957, Ser. No. 695,489
14 Claims. (Cl. 260—46.5)

This invention relates in general to the synthesis of organosilicon compounds. More particularly, the invention is concerned with aqueous admixtures of organosilicon compounds which contain alkoxy groups bonded to the silicon atom thereof and which also contain the amino functional group linked to the same silicon atom through at least three carbon atoms of an alkylene group as new compositions of matter. The invention further contemplates the provision of novel classes of organopolysiloxanes derived from the aqueous admixtures referred to above and to a process for their production.

The present invention is based, in part upon our discovery that certain alkoxysilanes, namely trialkoxysilanes which contain an amino functional group linked to the silicon atom thereof through at least three carbon atoms of an alkylene group are miscible with aqueous mediums and form stable admixtures therewith. The present invention is also based, in part, upon our discovery that such trialkoxy-silanes when admixed with an aqueous medium hydrolyze at a slow rate and subsequently condense to form mixtures of water-miscible organopolysiloxanes from which mixtures novel types of organopolysiloxanes can be recovered.

The trialkoxysilanes suitable for use in preparing aqueous admixtures of the present invention are the aminoalkyltrialkoxysilanes which can be depicted by the structural formula:

$$H_xN[C_aH_{2a}Si(OR)_3]_{3-x}$$

wherein R represents an alkyl group such as methyl, ethyl, propyl and the like, $C_aH_{2a}$ is an alkylene group, $a$ is a number having a value of at least 3 and preferably from 3 to 9 and $x$ is a number having a value of from 0 to 2. Trialkoxysilanes falling within the above structural formula are disclosed and claimed in our copending U.S. applications Serial No. 483,421, filed January 21, 1955, now U.S. Patent No. 2,832,754, and Serial No. 696,931, filed concurrently herewith and include such compounds as: triethoxysilylpropylamine (gamma-aminopropyltriethoxysilane), tripropoxysilylpropylamine (gamma-aminopropyltripropoxysilane), triethoxysilylbutylamine (delta-aminobutyltriethoxysilane), tripropoxysilylbutylamine (delta-aminobutyltripropoxysilane), triethoxysilylisobutylamine (gamma-aminoisobutyltriethoxysilane), triethoxysilyl - gamma-methylpropylamine (gamma-aminobutyltriethoxysilane), and the like.

In the practice of our invention, the aqueous admixtures thereof can be prepared by forming a mixture of an aminoalkyltrialkoxysilane, in which the amino group is linked to the silicon atom thereof through at least three carbon atoms of a divalent alkane group, with an aqueous medium such as water or mixtures of water and a water-miscible liquid organic compound, which is a solvent for, but not reactive with, the aminoalkyltrialkoxysilane. Typical of the water-miscible liquid organic compounds suitable for use as one component of an aqueous medium are: the alkanols such as ethanol, propanol, butanol and the like and the water-miscible ethers such as tetrahydrofuran and dioxane.

In preparing our aqueous admixtures, the amount of water present in the aqueous medium is critical but can vary over a wide range. We employ at least one mole of water per mole of the aminoalkyltrialkoxysilane and can employ from 10 up to 100 and more moles of water per mole of the aminoalkyl-trialkoxysilane. The amount of a water-miscible organic compound present in such aqueous mediums, varies in accordance with the amount of water employed. We can employ such compounds in an amount which can vary from zero parts up to its upper limit of solubility in water. When such liquid organic compounds are miscible with water in all proportions, we can employ an amount thereof which varies from 40 to 60 parts of one to 60 to 40 parts of the other.

The aqueous admixtures of the present invention are stable compositions of matter forming solutions which find use as a size or finish for inorganic oxide fillers employed in combination with thermosetting resins to produce composite articles. Such is disclosed and claimed in our copending U.S. application Serial No. 483,423, filed January 21, 1955, now abandoned, and our copending U.S. application Serial No. 615,482, filed October 12, 1956. As is also disclosed and claimed in said above-identified copending applications our aqueous admixtures can also be employed to modify certain thermosetting resins, particularly such thermosetting resins as the aldehyde-condensation resins, and the urethane resins to permit their use in combination with non-sized glass cloth. The present invention is also a continuation-in-part of our application Serial No. 615,483, filed October 12, 1956 which in turn was a continuation-in-part of our application Serial No. 483,421, filed January 21, 1955, now U.S. Patent 2,832,754.

According to our experience, the aminoalkyltrialkoxysilanes which we employ to prepare our aqueous admixtures hydrolyze at a slow rate when dissolved in aqueous mediums and so condense to form a hydrolyzate comprising a specific variety of aminoalkylpolysiloxanes which can remain in solution. By concentrating such hydrolyzates or solutions, we have found that the aminoalkylpolysiloxanes present therein can be recovered in a form comprising for the most part hydroxy-, or alkoxy-containing aminoalkylpolysiloxanes.

In the practice of this embodiment of our invention, a hydrolyzate is prepared by forming a mixture of an aminoalkyltrialkoxysilane with water or with a mixture of water and a water-miscible liquid organic compound, comparable to that described above, permitting the admixture to stand for a period of from about ten to about fifteen minutes or more to permit the trialkoxysilane to hydrolyze and form a hydrolyzate and concentrating the hydrolyzate by means which removes water (if any is present), the liquid organic compound (if any is employed), and the alkanol by-product of the process. There results or is produced a concentrated hydrolyzate comprising hydroxy-, or alkoxy-containing aminoalkylpolysiloxanes.

In preparing our hydrolyzates, the amount of water employed wil vary in accordance with the type of aminoalkylpolysiloxane desired. That is to say, the amount of water employed is critical to the extent that it not only determines whether the aminoalkylpolysiloxane contains silicon-bonded alkoxy or hydroxy groups, but in addition determines the average number of such groups on the resulting polysiloxane.

To prepare a hydrolyzate comprising an aminoalkylpolysiloxane having silicon-bonded alkoxy groups, we first form a mixture of an aminoalkyltrialkoxysilane with an amount of water insufficient to completely hydrolyze the silicon-bonded alkoxy groups present in the starting silane and then permit the mixture to stand for a period of from about ten to fifteen minutes. There results or is produced, in most instances, by the hydrolysis and condensation of a limited number of alkoxy groups, a two-phase (solid and liquid) system. The solid phase can be a white or colorless solid-like material which comprises a hydroxy-rich aminoalkylpolysiloxane, and the liquid phase comprises a mixture of an alkoxy-containing aminoalkylpolysiloxane and the alkanol by-product of the reaction. The hydroxy-rich phase can be filtered from the hydrolyzate and dried to form a white or colorless solid product. Such hydroxy-rich aminoalkylpolysiloxanes are cross-linked polymers having an average of from about 0.2 or 0.3 up to about 1 hydroxy group per silicon atom. We obtain our alkoxy-containing aminoalkylpolysiloxanes by stripping from the liquid phase of the hydrolyzate the alkanol by-product of the reaction.

The alkoxy-containing polysiloxanes prepared by the above method have a relatively low degree of polymerization (from about 2 to 10) and contain a relatively large amount of alkoxy groups (having an average of from about 1 to 2 alkoxy groups per silicon atom). We have found that the two-phase system obtained by adding an aminoalkyltrialkoxysilane to an amount of water insufficient to hydrolyze all of the alkoxy groups bonded to the silicon atom thereof, when heated to a temperature at which the alkanol by-product distills, becomes homogeneous. Apparently, by so heating the two-phase system the hydroxy-rich polysiloxane phase undergoes further condensation yielding water which is free to further hydrolyze a portion of the alkoxy groups present in the alkoxy-rich aminoalkylpolysiloxane phase. Complete hydrolysis of all of the alkoxy groups present in the alkoxy-containing polysiloxanes does not occur as there is not a sufficient amount of water present. The alkoxy-containing polysiloxanes prepared by heating the above two-phase systems have a relatively high degree of polymerization (from at least about 10 up to about 100 and higher) and contain a relatively small amount of silicon-bonded alkoxy groups (an average of from about 0.1 up to a maximum of below about 1). Such polysiloxanes can be recovered by stripping the alkanol by-product from the mixture, leaving a liquid product.

The amount of water employed with an aminoalkyl-trialkoxysilane to prepare a hydrolyzate comprising an aminoalkylpolysiloxane having silicon-bonded alkoxy groups can vary from as little as about one-half mole to about 1.45 moles of the water per mole of the trialkoxysilane. In most instances we prefer to employ the water and the aminoalkyltrialkoxysilane in equi-molar amounts.

To prepare a hydrolyzate comprising an aminoalkyl-polysiloxane having silicon-bonded hydroxy groups, we first form a mixture of an aminoalkyltrialkoxysilane with an amount of water in excess of that required to completely hydrolyze the silicon-bonded alkoxy groups present in the starting silane and then permit the mixture to stand for a short period. There results, or is produced, by the hydrolysis of the alkoxy groups and by subsequent condensation, a homogeneous mixture or solution containing aminoalkylpolysiloxanes having silicon-bonded hydroxy groups. The aminoalkylpolysiloxanes present in the homogeneous solution comprise a mixture of polymers having a degree of polymerization of from as little as two (a disiloxane) up to about 100 to 200 and more (a cross-linked polymer). Such polysiloxanes contain silicon-bonded hydroxy groups in an average amount of from about 0.2 to 0.3 (for the cross-linked polymers) up to a maximum of 2 (for the disiloxane) per silicon atom. The hydroxy-containing aminoalkylpolysiloxanes can be separated from solution by vacuum stripping the alkanol by-product of the reaction and excess water present therein.

We have found that if the above hydrolyzate is gently heated, as for example up to about 80° C., condensation of the hydroxy groups occurs to yield hydroxy-containing aminoalkylpolysiloxanes containing as little as about an average 0.1 hydroxy groups per silicon atom. Such polysiloxanes can be liquid or solid materials depending on the amount of cross-linking therein and can be recovered by stripping the alkanol and water therefrom.

Should the hydrolyzate be heated to too high a temperature excessive condensation occurs and the resulting aminoalkylpolysiloxanes become hard materials finding little practical utility.

We have found that useful hydroxy-containing amino-alkylpolysiloxanes should contain an average of at least 0.1 hydroxy groups per silicon atom. Such polysiloxanes form homogeneous solutions with water or with water-miscible liquid organic compounds either upon the direct addition thereof to water or upon a gentle heating of the mixture.

The polymerization or hydrolysis of our aminoalkyltri-alkoxysilane starting materials apparently commences upon contact of the trialkoxysilanes with water and procedes at a slow rate. The hydrolysis reaction is mildly exothermic as some heat is evolved. However, if the amount of water employed to prepare our hydrolyzate is more than about ten moles per mole of the trialkoxysilane, the heat of reaction is absorbed thereby and the exothermic nature of the reaction is not apparent. In general, we have found that the temperature of the reaction mixture varies from about 20° C. up to about 50° C. The amino-alkylpolysiloxanes of our invention can be graphically depicted by the formula:

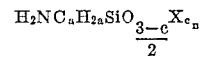

wherein $C_aH_{2a}$ is an alkylene group, $a$ is a number having a value of at least 3 and preferably from 3 to 9, X is a member taken from the group consisting of hydroxy and alkoxy groups, $c$ is a number having an average value of from 0.1 to 2, and $n$ is a number having a value of at least 2 and can be as high as 200 or more.

Of particular interest as combinations with our hydroxy- or alkoxy-containing aminoalkylpolysiloxanes are the aldehyde condensation resins which are prepared by the reaction of an aldehyde, or of a compound capable of yielding an aldehyde upon reaction, with an organic compound such as hexamethylenetetramine, phenols, urea, and the like to produce methylol-containing derivatives which may be partially condensed to resinous materials. Examples of such aldehyde condensation resins include: the phenol-formaldehyde resins, the phenol-acetaldehyde resins, the phenol-furfural resins, the cresol-formaldehyde resins, the urea-formaldehyde resins, the melamine-formaldehyde resins and the like.

EXAMPLE 1

*Alkoxy-Containing Aminopropylpolysiloxanes*

One mole of gamma-aminopropyltriethoxysilane was added to a 500 ml. round-bottomed flask and while stirring the contents of the flask 0.6 mole of distilled water added thereto. The mixture was originally homogeneous, but on standing for about fifteen minutes a white precipitate settled out. After permitting the mixture to stand for a period of twenty-four hours, it was gently heated to form a homogeneous mixture and the ethanol by-product distilled therefrom. The resulting aminoalkylpolysiloxane has the empirical formula:

$$H_2NCH_2CH_2CH_2SiO_{1.35}(OEt)_{0.30}$$

Analysis for carbon, hydrogen, silicon, nitrogen and ethoxy content was as follows.

Calculated:[1] C, 40.8; H, 8.9; Si, 19.1; N, 9.5; OEt, 30.6. Found: C, 39.5; H, 9.3; Si, 22.8; N, 11.3; OEt, 11.1.

EXAMPLE 2

*Ethoxy-Containing Gamma-Aminopropylpolysiloxanes*

Gamma-aminopropyltriethoxysilane (30.1 grams) was mixed with an equal volume of diethyl ether and poured over 100 cc. cracked ice (excess of stoichiometric amount) covered with 50 ml. diethyl ether. The mixture was ---
[1] Calculated on the unit [NH₂C₃H₆SiO(OEt)].

vigorously stirred until the ice melted, then allowed to stand at room temperature overnight. The resulting solution was stripped of ether and water under reduced pressure at room temperature. The residue was a colorless, brittle, glass-like polymer (12.06 grams) which was powdered and dried at room temperature under reduced (1–2 mm. Hg) pressure overnight. Analysis of the dried powder showed it to contain residual OH groups.

Analysis.—Calculated for the unit $[NH_2C_3H_6SiO_{1.5}]$: C, 32.7; H, 7.3; Si, 25.5; N, 12.7; OH, 0 wt. percent. Found: C, 30.0; H, 7.8; Si, 28.4; N, 11.6; OH, 0.45 wt. percent.

The empirical formula of the polymer:

$$H_2NCH_2CH_2CH_2SiO_{1.3}OH_{.4}$$

The polymer is soluble in ethanol-water admixtures.

EXAMPLE 3

*Preparation of Bis(Gamma-Aminopropyldiethoxy) Disiloxane*

To a 500 cc. flask containing 0.5 mole of gamma-aminopropyltriethoxysilane was added 0.25 mole of water. Prior to the addition of the water, the flask had been immersed in a water-ice bath and after the addition, the flask was removed from the bath. The reaction mixture comprised at first a homogeneous mixture, however, after a period of about 10 minutes a white precipitate formed. A portion of the liquid phase was separated, the water and ethanol stripped therefrom and analyzed by infrared analysis. A relatively large amount of bis(gamma-aminopropyldiethoxy)disiloxane was present. The remaining portion of the hydrolyzate was heated gently and the ethanol stripped therefrom. An aminoalkylpolysiloxane was obtained having an average ethoxy content of about 0.1 alkoxy group per silicon atom.

EXAMPLE 4

*Hydroxy- and Ethoxy End-Blocked Gamma-Aminopropylpolysiloxanes*

To a 500 cc. flask, immersed in a water-ice bath was added diethyl ether and 0.5 mole of gamma-aminopropyltriethoxysilane and 0.5 mole of water. After the addition, the flask was removed from the water-ice bath and the mixture allowed to stand for a period of about four hours. During this period a white solid precipitate formed. The precipitate was filtered, washed with diethyl ether and dried under reduced pressure. The white solid was analyzed and identified as a gamma-aminopropylpolysiloxane containing silicon-bonded hydroxy groups in an average amount of slightly less than 1 hydroxy group per silicon atom.

The liquid portion of the hydrolyzate was then placed in a flask and the ethanol and water stripped therefrom. Analysis of the product disclosed it to comprise an ethoxy-containing gamma-aminopropylpolysiloxane containing about 1 alkoxy group.

EXAMPLE 5

A mixture was formed comprising 1 mole of gamma-aminopropyltriethoxysilane and 2 moles of water. The mixture comprised a homogeneous solution which was permitted to stand for a period of several hours. The solution was then placed in a flask and the water and ethanol by-product stripped therefrom. There was obtained a hydroxy-containing gamma-aminopropylpolysiloxane containing an average of about 0.6 hydroxy groups per silicon atom.

EXAMPLE 6

A No. 181 glass cloth, which had previously been subjected to heat cleansing, was immersed in a solution consisting of equal parts by weight of water and ethanol and containing 1.2 percent by weight of triethoxysilylpropylamine. After removal from solution, the glass cloth was drained and air dried at room temperature to remove the solvent therefrom. The amount by weight of the size contained by the glass cloth when calculated in terms of percent by weight thereof of aminopropylpolysiloxane was 0.83 percent (based on analytical data for combustible carbon on the sized cloth).

Laminates were prepared from a portion of the treated glass cloth by laying up, in accordance with customary practices, alternating layers of the cloth and a commercial melamine-aldehyde condensation polymer ("Melmac 405," a melamine resin sold by the American Cyanamid Co.), which resin was employed as a solution containing 50 percent solids by weight in a solvent consisting of 95 parts water and 5 parts butanol. The laminates thus laid up were precured at a temperature of about 125° C. for a period of about five minutes in accordance with the manufacturer's recommendations. They were then subjected to a final curing treatment at a temperature of 150° C. for a period of about ten minutes in a hydraulic press at a pressure of 1000 pounds per square inch. The laminates comprised 13 plies and had a cured thickness of from 0.102 inch to 0.110 inch. It was calculated that the cured laminates contained about 45 percent by weight thereof of the melamine resin.

The laminates were evaluated by conducting tests of flexural strength on specimens cut from the material, one test being conducted on the material as cured and a second on a specimen that was subjected to boiling tap water for a period of two hours, cooled to room temperature in water and then tested wet. The flexural tests were carried out as described in Air Force Specification MILP–8013 (also Federal Specification LP406a, Method No. 1031). These tests were conducted by placing a specimen one inch by four inches on standardized supports, two inches apart, and the specimen then broken by a load applied midway between the two supports.

Similar dry and wet tests were conducted on non-sized glass cloth "Melmac 405" laminates of 13 ply. These laminates were of approximately the same thickness as those prepared from the sized glass cloth. The comparative results of the flexural tests appear in the table below.

Following the above procedure, a solution comprising 1.2 percent by weight of delta-aminobutyltriethoxysilane dissolved in equal parts by weight of water and ethanol was employed to coat a No. 181 glass cloth. Laminates were prepared from the coated glass cloth and such laminates tested also in accordance with the procedure described above.

TABLE.—FLEXURAL STRENGTH

|  | Dry, p.s.i. | Wet, p.s.i. | Percent Retention |
|---|---|---|---|
| Non-sized glass cloth laminate | 24,400 | 13,800 | 56.5 |
| Sized glass cloth laminate (glass cloth treated with a solution of triethoxysilylpropylamine) | 80,000 | 76,500 | 95.8 |
| Sized glass cloth laminate (glass cloth treated with a solution of triethoxysilylbutylamine) | 90,350 | 89,875 | 99 |

EXAMPLE 7

Gamma-aminopropylsilicones containing from 0.4 to 0.5 weight-percent of ethoxy groups and from 5.7 to 8.6 weight-percent hydroxyl groups were prepared by reacting gamma-aminopropylsilane with amounts of water in excess required for the complete hydrolysis of the amounts of gamma-aminopropylsilane employed. The conditions of hydrolysis and the drying conditions after hydrolysis are outlined in the table below. Water-soluble gamma-aminopropylsilicones having the formula:

$$H_2NCH_2CH_2CH_2SiO_{0.9 \text{ to } 1.2}(OH)_{0.3 \text{ to } 0.6}$$

were obtained. The results of —OH, —OC₂H₅ and N content determinations are provided in the table below.

| Run No. | Hydrolysis Conditions | Drying¹ Conditions | Analytical Data | | |
|---|---|---|---|---|---|
| | | | Wt., Percent OH | Wt., Percent OET | Wt., Percent N |
| 1 | Refluxed 1 hr; stirred overnight at about 25° C. | Vacuum stripped at 60° C. for 3 hr. | 5.7 | 0.4 | 12.5 |
| 2 | Refluxed 2 hr; allowed to stand 3 days at about 25° C. | Vacuum dried at 210° C. for 16 hr. | 7.4 | | 11.7 |
| 3 | Refluxed 16 hr. | Vacuum dried at 110° C. for 16 hr. | 6.1 | | 11.5 |
| 4 | Refluxed 2 hr; allowed to stand overnight at about 25° C. | Vacuum dried at 100° C. for 16 hr. | 6.3 | | 12.2 |
| 5 | Stirred at 25° C. for 16 hr. | Vacuum dried at 50° C. for 16 hr. | 8.6 | 0.4 | 12.1 |

¹ Drying done in vacuum oven at about 2 mm. Hg pressure.

Hydroxy- and alkoxy-containing copolymers comprised of aminoalkylsiloxane units of the formula:

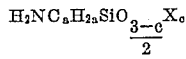

where $C_aH_{2a}$, $a$, $c$, and X are as previously defined and hydrocarbylsiloxane units of the formula:

where R″ represents a monovalent hydrocarbon group can also be made in accordance with our invention. Our copolymers can also contain end-blocking units of the formula:

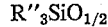

where R″ is previously defined and furthermore can contain trifunctional hydrocarbylsiloxane units, $R''SiO_{3/2}$. An advantageous method for making these hydroxy- and alkoxy-containing copolymers is to equilibrate the aminoalkylpolysiloxanes herein described with hydrocarbylsiloxanes, either cyclics or linears, which are well known in the art as for example dimethylsiloxanes, diphenylsiloxanes, methylphenylsiloxanes, and the like, in the presence of an aquilibrating catalyst such as potassium silanolate and the like. The following example illustrates a typical preparation of our copolymers.

EXAMPLE 8

In a 500 cubic centimeter flask there were placed 250 cubic centimeters of water and 5.9 grams of gamma-aminoisobutyltriethoxysilane. After standing for a short time, the resulting aqueous solution of gamma-aminoisobutylsilicone polymer was evaporated to dryness to remove the water. There was obtained a solid resinous gamma-aminoisobutylsilicone polymer containing residual hydroxyl groups.

What is claimed is:

1. A process for preparing aminoalkylpolysiloxanes consisting essentially of units having the average formula:

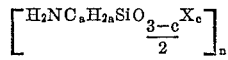

wherein $C_aH_{2a}$ is an alkylene group, $a$ is a number having a value of at least 3, X is a member taken from the group consisting of hydroxy and alkoxy, $c$ is a number from 0.3 to 2, $n$ is a number having a value of at least 2, and the nitrogen atom is interconnected to the silicon atom through at least 3 carbon atoms, which comprises adding an aminoalkyltrialkoxysilane having the formula:

wherein R represents an alkyl group, $C_aH_{2a}$ is an alkylene group, $a$ is a number having a value of at least 3, the nitrogen atom is interconnected to the silicon atom through at least three carbon atoms and $x$ is a number having a value of form 0 to 2, to water in a ratio of at least one mole of water per mole of the aminoalkyltrialkoxysilane.

2. A copolymeric siloxane consisting essentially of (1) at least two units having the average formula:

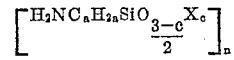

wherein $C_aH_{2a}$ is an alkylene group, $a$ is a number having a value of at least 3, X is a member taken from the group consisting of hydroxy and alkoxy, $c$ is a number from 0.1 to 2, $n$ is a number having a value of at least 2, and the nitrogen atom is interconnected to the silicon atom through at least 3 carbon atoms, and (2) at least one unit selected from the group consisting of:

(a)          $R''_2SiO$ (b)          $R''_3SiO_{1/2}$ and (c)          $R''SiO_{3/2}$ wherein R″ is a monovalent hydrocarbon group.

3. The copolymeric siloxane of claim 2 wherein X is a hydroxy group.

4. The aminoalkylsiloxanes of claim 5 wherein X is a hydroxy group.

5. Aminoalkylpolysiloxanes having the average formula:

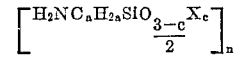

wherein $C_aH_{2a}$ is an alkylene group, $a$ is a number having a value of at least 3, X is a member taken from the group consisting of hydroxy and alkoxy, $c$ is a number from 0.3 to 2, $n$ is a number having a value of at least 2, and the nitrogen atom is interconnected to the silicon atom through at least 3 carbon atoms.

6. A delta-aminobutylpolysiloxane containing from 0.3 to 2 silicon-bonded ethoxy groups per silicon atom.

7. A delta-aminobutylpolysiloxane containing from 0.3 to 2 silicon-bonded hydroxy groups per silicon atom.

8. A gamma-aminopropylpolysiloxane containing from 0.3 to 2 silicon-bonded ethoxy groups per silicon atom.

9. A gamma-aminopropylpolysiloxane containing from 0.3 to 2 silicon-bonded hydroxy groups per silicon atom.

10. A gamma-aminoisobutylpolysiloxane containing from 0.3 to 2 silicon-bonded ethoxy groups per silicon atom.

11. A gamma-aminoisobutylpolysiloxane containing from 0.3 to 2 silicon-bonded hydroxy groups per silicon atom.

12. Bis(gamma-aminopropyldiethoxy)disiloxane.

13. The copolymeric siloxane of claim 2 wherein X is an alkoxy group.

14. The aminoalkylpolysiloxanes of claim 5 wherein X is an alkoxy group.

References Cited in the file of this patent

UNITED STATES PATENTS

| 2,738,357 | Speier | Mar. 13, 1956 |
| 2,754,311 | Elliott | July 10, 1956 |
| 2,755,269 | Moorhead | July 17, 1956 |
| 2,762,823 | Speier | Sept. 11, 1956 |
| 2,832,754 | Jex et al. | Apr. 29, 1958 |
| 2,881,184 | Pike | Apr. 7, 1959 |
| 2,921,950 | Jex et al. | Jan. 19, 1960 |